United States Patent
Kirkpatrick et al.

(10) Patent No.: US 6,853,287 B1
(45) Date of Patent: Feb. 8, 2005

(54) COIL FOR USE ON A SUBSTRATE

(75) Inventors: Peter Kirkpatrick, Santa Clara, CA (US); Thomas Mader, San Jose, CA (US); Jean-Marc Verdiell, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/272,103

(22) Filed: Oct. 15, 2002

Related U.S. Application Data

(62) Division of application No. 09/823,465, filed on Mar. 30, 2001.

(51) Int. Cl.[7] .............................................. H01F 27/28
(52) U.S. Cl. ...................... 336/200; 336/232; 257/531; 257/784; 257/728; 257/786; 257/724; 257/725; 257/528
(58) Field of Search ................................ 336/200, 186, 336/187, 205, 208, 232; 257/531, 784, 728, 786, 724, 725, 528; 29/602.1; 330/206, 269

(56) References Cited

U.S. PATENT DOCUMENTS

| | | | |
|---|---|---|---|
| 5,430,613 A | 7/1995 | Hastings et al. | |
| 5,519,233 A | * 5/1996 | Fukasawa | 257/275 |
| 5,543,773 A | 8/1996 | Evans et al. | |
| 5,611,008 A | 3/1997 | Yap | |
| 6,194,774 B1 | * 2/2001 | Cheon | 257/531 |
| 6,207,950 B1 | 3/2001 | Verdiell | |
| 6,285,043 B1 | 9/2001 | Yap | |
| 6,292,084 B1 | 9/2001 | Choi et al. | |
| 6,511,236 B1 | 1/2003 | Webjorn et al. | |
| 6,542,379 B1 | 4/2003 | Lauffer et al. | |
| 6,585,427 B2 | 7/2003 | Finot et al. | |

* cited by examiner

*Primary Examiner*—Lincoln Donovan
*Assistant Examiner*—Jennifer A. Poker
(74) *Attorney, Agent, or Firm*—Blakely, Sokoloff, Taylor & Zafman LLP

(57) ABSTRACT

There is provided a coil and a method for fabricating the same. One embodiment of the coil includes a plurality of traces in one area of a substrate. Each trace has a first end located at a first side of the area, and a second end located at a second side of the area opposite the first side. A plurality of wires couples the plurality of traces to form a coil. Each wire couples the first end of one trace to the second end of another trace located adjacent to the one trace.

12 Claims, 4 Drawing Sheets

COIL FOR USE ON A SUBSTRATE

This is a divisional of application Ser. No. 09/823,465, filed on Mar. 30, 2001, entitled "A COIL FOR USE ON A SUBSTRATE," and assigned to the corporate assignee of the present invention.

FIELD OF THE INVENTION

The present invention relates generally to packages having optical and electrical components, and more particularly, to a package having a coil created using traces on a substrate in the package and wires coupling the traces together.

BACKGROUND

Sealed packages are necessary to contain, protect, and couple to optical fibers and electrically connect optoelectronic components. Optoelectronics packaging is one of the most difficult and costly operations in optoelectronics manufacturing. Optoelectronic packages provide submicron alignment between optical elements, high-speed electrical connections, excellent heat dissipation, and high reliability. Providing such features has resulted in optoelectronic packages that are larger, costlier, and more difficult to manufacture than electronic packages. In addition, current designs of optoelectronic packages and associated fabrication processes are ill adapted for automation because today's high-performance butterfly packages are characterized by a large multiplicity of mechanical parts (submount, substrate coils, brackets, ferrules, etc.), three-dimensional (3D) alignment requirements, and poor mechanical accessibility.

Optoelectronic packages exist for optical components such that the components are easily aligned within a package. Such a package may be manufactured inexpensively and in an automatable method. Such an optoelectronic assembly generally includes a substrate with a positioning floor, which provides a mounting surface for a number of optical elements, or components. For example, an edge emitting optoelectronic element such as a laser diode may be mounted on the mounting surface of a substrate. Other optical components may also be used.

The use of coils in the electronic devices, such as packages, is well-known in the art. A coil may serve to isolate a DC circuit from a high-speed circuit in a package. Generally, each end of the coil is wire bonded to a component on each end of the coil. That component may be a high speed line on one end. A resistor may be wire bonded to another end of the coil. Generally, this coil must be mechanically assembled or made before being attached in the package. A pick and place method may be used to attach the coil in a particular location in the package. Due to the bulky size of the coil, it is difficult to place the coil for coupling. There may also be problems with mechanical accessibility and alignment.

SUMMARY OF THE INVENTION

A coil and package including the same are described. In one embodiment, the coil includes traces in one area of a substrate. Each trace has a first end located at a first side of the area and a second end located at a second side of the area opposite the first side. Multiple wires couple the traces to form a coil. Each wire couples the first end of one trace to the second end of another trace located adjacent to the one trace.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and an apparatus for a coil are described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Figure 1:
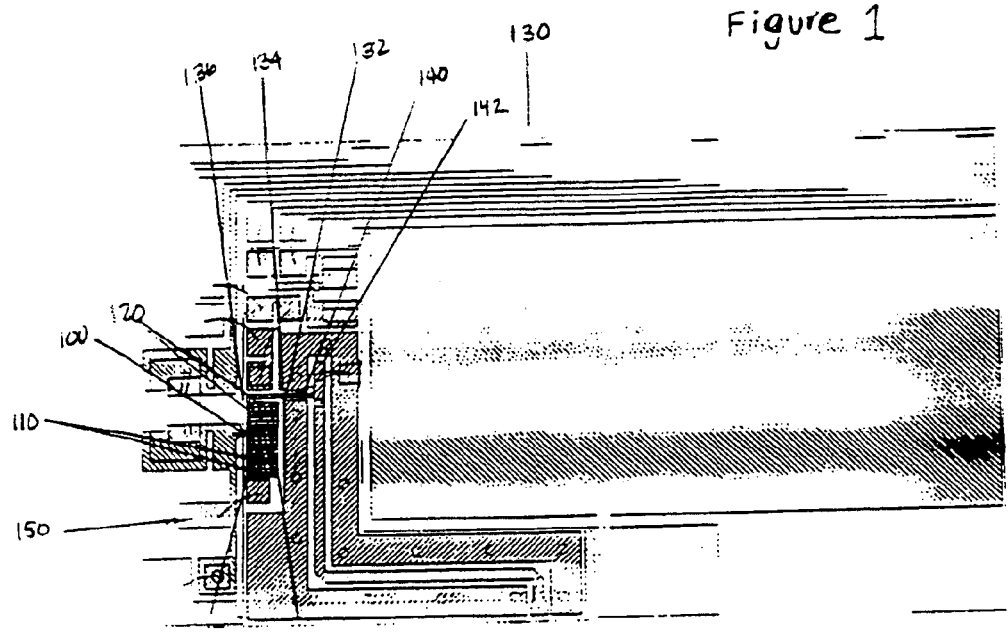
FIG. 1 illustrates one embodiment of a coil.

FIG. 1 illustrates one embodiment of a coil 100. The coil 100 includes traces 110 and wires 120. In one embodiment, the traces 110 may be created on a metallized substrate 130. In an alternative embodiment, the traces 110 may be created on a circuit board. Any number of methods may be used to create the traces 110. For example, the traces 110 may be etched into the substrate 130 itself. This is referred to as metalization. In an alternative embodiment, a milling technique may be used. Alternative methods, such as printing, may also be used in which material is printed on a substrate, for example, and then the material is patterned.

In the embodiment shown in FIG. 1, the traces 110 are substantially parallel to each other, and each trace 110 has a first end 112 and a second end 114. As seen in FIG. 1, the first ends 112 of the traces 110 are located at a first side 134 of the area 132 of the substrate 130 and the second ends 114 are located at a second side 136 of the area 132 of the substrate 130 opposite the first side 134. The wires 120 are coupled to the traces 110 to form the coil 100. Each wire 120 couples the first end 112 of one trace 110 to the second end 114 of another trace 110 adjacent to the one trace 110.

In the embodiment shown in FIG. 1, the traces are wire-bonded together in a manner well known in the art. In alternative embodiments, other methods, such as welding and soldering, may be used.

In one embodiment, the coil allows the use of an automated wirebonder to create high-performance inductors simply and at negligible cost, greatly simplifying the assembly of a high-speed optoelectronic package.

In one embodiment, a resistor 140 may be coupled to the coil 100. This is shown in FIG. 1. In one embodiment, the coil 100 may also be connected to a high speed line. The coil 100 isolates a DC circuit 142 from a high-speed circuit 150 in the package. The DC circuit 142 may be for bias and the high-speed circuit 150 may be for data input. These circuits may be transmission lines leading to other components or devises. The resistor 140 aids in damping if there is a resonance in the circuit. Such a resistor may not be necessary, however.

Figure 2:
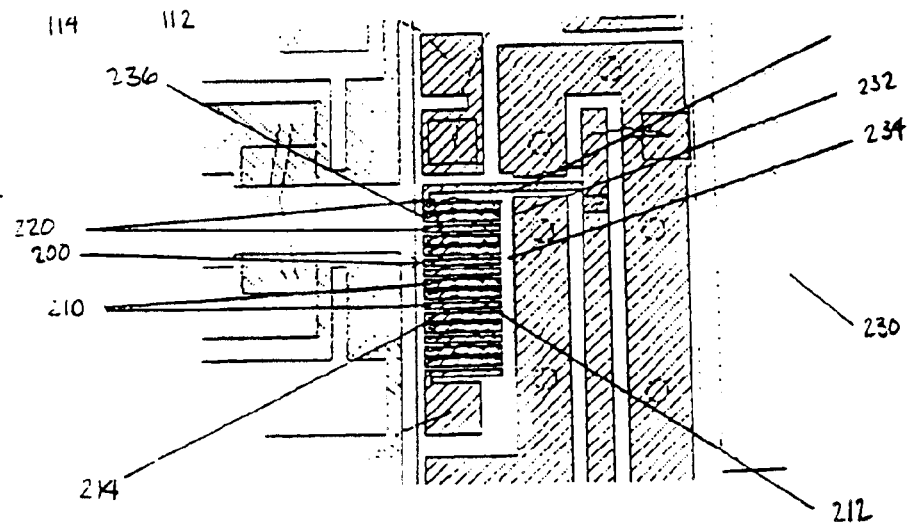
FIG. 2 illustrates an exploded view of the embodiment shown in FIG. 1.

FIG. 2 illustrates an exploded view of the embodiment shown in FIG. 1. The coil 200 includes traces 210 and wires 220. The traces 210 may be created in a substrate 230 using any number of methods. For example, the traces 210 may be etched onto the substrate 230 itself. In alternative embodiments, other methods may be used. In FIG. 2, embodiment, each trace 210 has a first end 212 and a second end 214. The first ends 212 of the traces 210 are located at a first side 234 of the area 232 of the substrate 230 and the second ends 214 are located at a second side 236 of the area 232 of the substrate 230 opposite the first side 234. The wires 220 are coupled to the traces 210 to form the coil 200. Each wire 220 couples the first end 212 of one trace 210 to the second end 214 of another trace 210 adjacent to the one trace 210.

Figure 3:
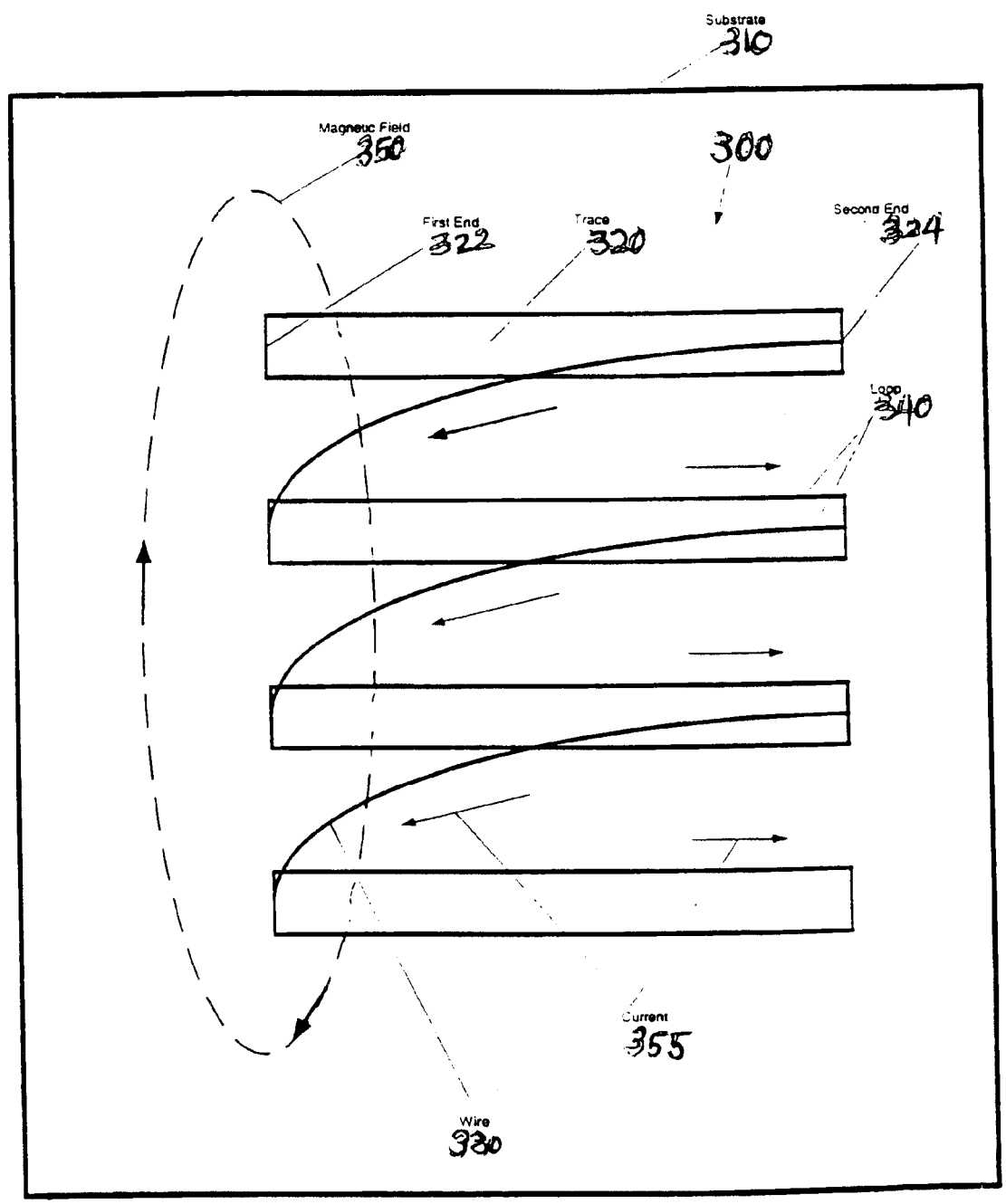
FIG. 3 illustrates an alternative representation of a coil.

In one embodiment, the traces are 2 mm long and have a pitch of 0.08 mm nm. Generally, the closer the traces are next to one another or the smaller the pitch, the higher the inductance. The embodiment shown in FIGS. 1 and 2 have a high impedance and a low parasitic capacitance. For purposes of using a wire-bonding machine to couple the wires to the traces, the wires are 0.5 mm long and have a 0.5 mm loop height. A discussion of loops in reference to FIG. 3 is given below. Changes in geometry, including height, length, and pitch cause changes in inductance and parasitics (capacitance). The measurements specified for this embodiment are illustrative of one embodiment however. Alternative specifications may be used to create a substrate coil.

FIG. 3 illustrates an alternative representation of a coil 300. Multiple loops 340 form the coil 300. Each loop 340 includes a trace 320 and a wire 330. In FIG. 3, each trace 320 has a first end 322 and a second end 324. The first ends 322 of the traces 320 are located at a first side of the substrate 310 and the second ends 324 are located at a second side of the substrate 310 opposite the first side. The wires 330 are coupled to the traces 320 to form the coil 300. Each wire 330 couples the first end 322 of one trace 320 to the second end 324 of another trace 320 adjacent to the one trace 320. Current 355 flows through the coil 300 as seen in FIG. 3.

Therefore the loops 340 are linked by a magnetic field or flux 350.

In one embodiment, the coil is attached to a substrate in an optoelectronic package. An optoelectronic package uses a flexure coupled to one or more optical components in order to support the components(s), as well as align one or more components in the package. In one embodiment, the flexure is attached (e.g., welded) to a portion of the interior of the package as part of the pick and place mounting method. In one embodiment, the alignment is 3D adjustable.

In high performance optoelectronic packages, critical optical elements require more precise placement than can be obtained with the combination of platform height control and two-dimensional pick and place. This is the case of single mode fibers, which have to be aligned within less than a micron precision to achieve high optical efficiency. In one embodiment, such components are mounted using a flexure, which allows for a small amount of vertical adjustment. The flexure may comprise two or more legs, which rest on a substrate or on each side of a frame. In one embodiment, the legs are joined by a body that supports or clamps the optical element. Two sections of material having a spring property join the legs to the body. Alternatively, the legs chambers may include the spring property. For more information on such a package, see U.S. patent Ser. No. 09/390,945, entitled "An Optoelectronic Assembly And Method For Fabricating The Same", filed Sep. 7, 1999, and assigned to the corporate assigned of the present invention.

Such a package may be manufactured inexpensively and in an automatable method. Embodiments of the optical package may have advantages in that it may be mass-produced at a low cost while maintaining an alignment of the optical components within the package.

Figure 4:
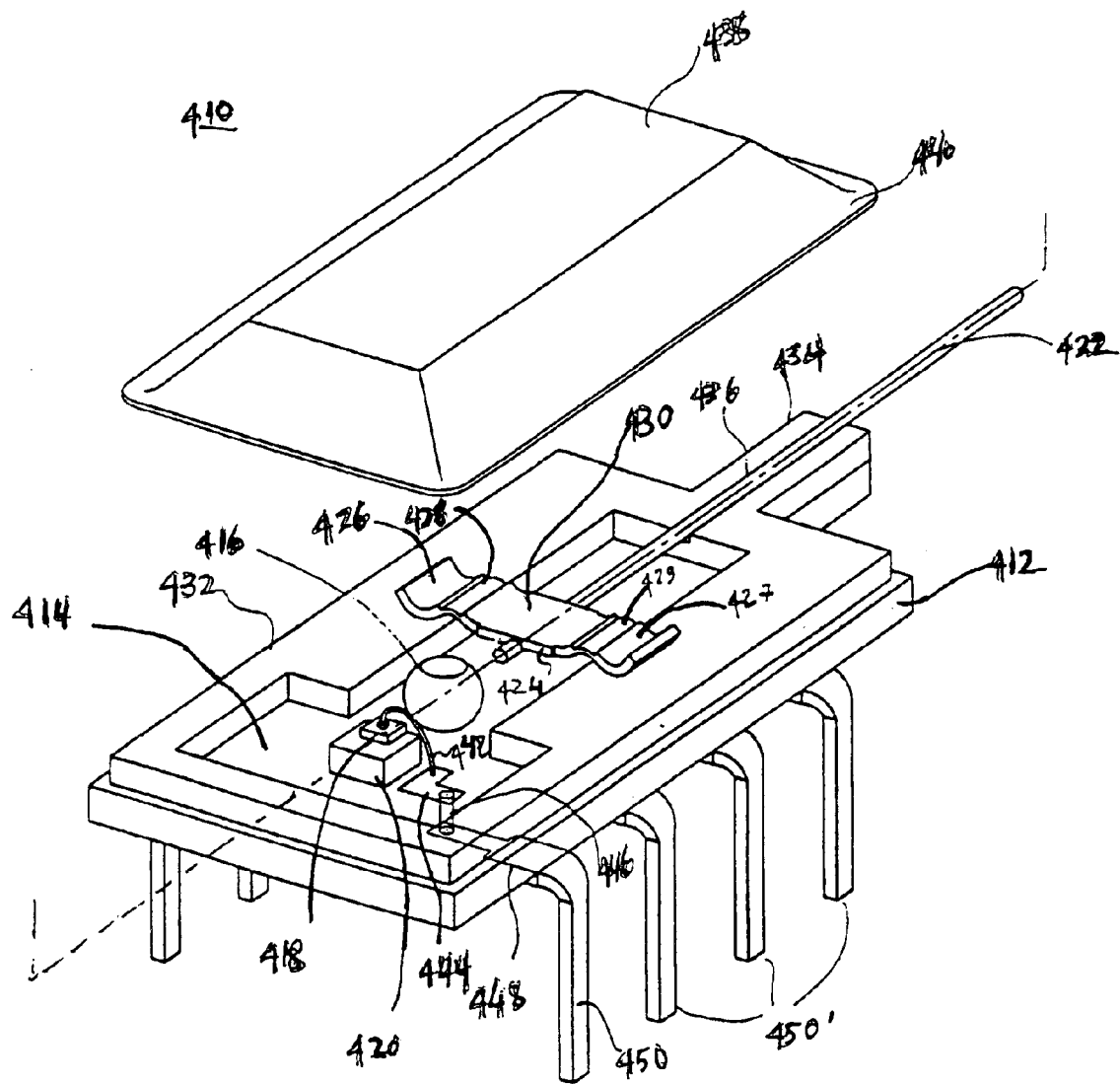
FIG. 4 illustrates one embodiment of an optoelectronic package.

FIG. 4 illustrates one embodiment of an optoelectronic assembly 410 with frame 432 and flexure 424. Assembly 410 also includes a substrate 412 with positioning floor 414, which may be substantially planar and the substrate 412 comprises an electronically isolating region with a low coefficient of thermal expansion. In one embodiment, a raised platform is created on positioning floor 414.

In one embodiment, the package comprises a substrate having a positioning floor, which provides a mounting surface and the package bottom wall. In one embodiment, the substrate and its positioning floor are substantially planar. In one embodiment, one or more raised platforms are also provided on the mounting surface. The raised platforms may be submounts made of a high thermal conductivity material, such as, for example, copper tungsten, Aluminum Nitride, Beryllium Oxide, Diamond, and Boron Nitride, attached to the floor of the substrate. The raised platforms may be attached, for example, by soldering or brazing, or may even be part of the substrate material itself.

Optical elements, or components, are mounted on positioning floor 414 and platform 420. In one embodiment, a lens 416 is mounted on substrate 412, and an surface emitting/receiving optoelectronic element 418, such as, for example, a laser diode, is mounted on platform 420. Other optical components may be used such as, for example, surface emitting optoelectronic elements, receiving optoelectronic elements, etc.

An optical element 422 is attached to flexure 425 by, for example, soldering, brazing or welding. In one embodiment, flexure 424 comprises two legs 426 and 427, a body 430, and two spring regions 428 and 429 at the junction of legs 426 and 427 and body 430. In one embodiment, element 422 is a single mode optical fiber, but it may be any element that requires optical alignment with other optical elements.

A frame 432 may be attached to substrate 412. The ends of legs 426 and 427 are attached to frame 432. In one embodiment, frame 432 has a protruding arm 434 having a groove 436. Groove 436 permits the hermetic passage of the fiber 422 to the outside of the package.

A cap 438 is attached to frame 432, thereby creating a hermetic seal. In one embodiment, cap 438 has a top hat shape and a peripheral lip 440 that can be hermatically sealed to the outside portion of frame 432 and on top of groove 436 and fiber 422. The hermetic seal may be created by a process such as seam welding, soldering or adhesive bonding.

In one embodiment, wire bond 442 connects active optical element 418 to electrically conductive pattern 444, which is on the top side of positioning floor 414. Filled conductive via 446 hermetically connects pattern 444 to electrically conductive pattern 448 on the bottom side of positioning floor 414. Pins 450 on the bottom side of positioning floor 414 are also provided for connections to electronic component inside the package through other vias (not shown). The combination of patterns 448 and 444 and filled via 446 provide an efficient and low-parasitic mechanism for hermetically distributing electrical signals from optoelectronic elements inside the hermetic enclosure to pins 450 at the periphery of package 410. Alternatively, signals can be distributed to ball grid array underneath the package for surface mounting.

Figure 5:
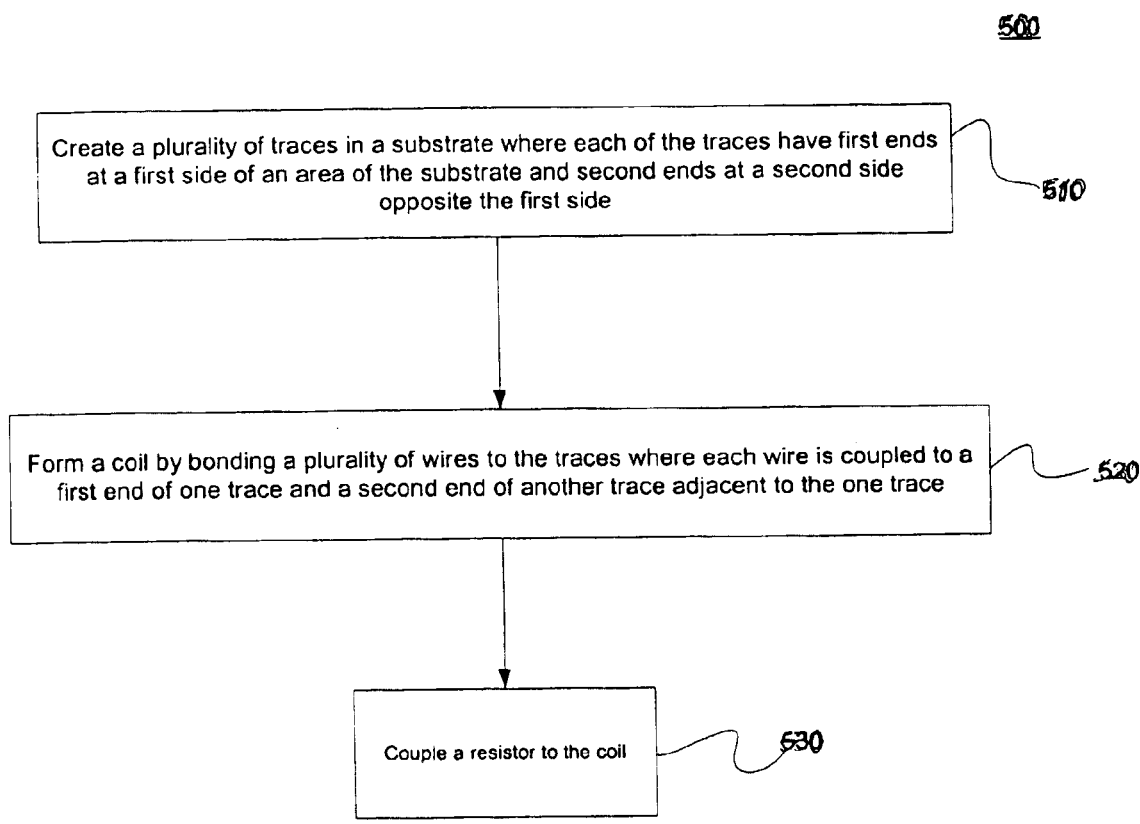
FIG. 5 illustrates a flow chart for a process of creating a coil.

FIG. 5 illustrates a flow chart for a process 500 of creating a coil in a substrate. In step 510, traces are created that have first ends at a first side of an area of the substrate and second ends at a second side of the area opposite to the first side. In step 520, the coil is formed by coupling the wires to the traces. Each wire couples the first end of one trace to the second end of another trace located adjacent to the one trace. In step 530, a resistor is coupled to the coil.

Thus, a coil has been described. Although the present invention is described herein with reference to specific embodiments, many modifications and variations therein will readily occur to those with ordinary skill in the art. Accordingly, all such variations and modifications are included within the intended scope of the present invention as defined by the following claims.

What is claimed is:

1. A coil comprising:
   a plurality of traces consecutively positioned in a substrate, each trace having a first end and a second end; and
   a plurality of wires, each wire bonded from the second end of one trace to the first end of another trace, wherein the plurality of wires is coupled to a Direct Current (DC) circuit and a high-speed circuit, the DC circuit is isolated from the high-speed circuit, and the DC circuit includes a resistor.

2. The coil of claim 1 wherein the traces are wire-bonded to the wires.

3. The coil of claim 1 wherein the traces are welded to the wires.

4. The coil of claim 1 wherein the traces have a length of 2 mm and a pitch of 1 mm.

5. A method comprising:
   creating a plurality of traces in one area of a substrate, each of the plurality of traces having first and second ends, the first ends of the plurality of traces located at a first side of the area of the substrate and second ends of the plurality of traces located at a second side of the area opposite the first side;
   coupling a plurality of wires to the plurality of traces, each of the plurality of wires coupling a first end of one trace of the plurality of traces to a second end of another of the plurality of traces located adjacent to the one trace, to form a coil; and
   isolating a Direct Current (DC) circuit from a high speed circuit using the coil.

6. The method of claim 5 wherein the traces are wire-bonded to the wires.

7. The method of claim 5 wherein the traces are welded to the wires.

8. The method of claim 5 wherein the traces have a length of 2 mm and a pitch of 1 mm.

9. An apparatus comprising:
   a Direct Current (DC) circuit;
   a high-speed circuit; and
   a coil including
      a plurality of traces consecutively positioned in a substrate, each trace having a first end and a second end; and
      a plurality of wires, each wire bonded from the second end of one trace to the first end of another trace, wherein the plurality of wires is coupled to the DC circuit and the high-speed circuit, the DC circuit is isolated from the high-speed circuit.

10. The apparatus of claim 9 wherein the traces are wire-bonded to the wires.

11. The apparatus of claim 9 wherein the traces are welded to the wires.

12. The apparatus of claim 9 wherein the DC circuit includes a resistor.

* * * * *